United States Patent

[11] 3,617,779

| [72] | Inventor | Robert Rosenberg<br>FairHaven, N.J. |
|---|---|---|
| [21] | Appl. No. | 743,860 |
| [22] | Filed | July 10, 1968 |
| [45] | Patented | Nov. 2, 1971 |
| [73] | Assignee | Bell Telephone Laboratories, Incorporated<br>Murray Hill, N.J. |

[54] ELECTROMAGNETIC ENERGY LOGIC EMPLOYING SATURABLE ABSORBERS
23 Claims, 5 Drawing Figs.

[52] U.S. Cl. ..................................................... 307/312,
307/216, 307/311, 350/160, 250/216
[51] Int. Cl. ....................................................... H03k 19/32
[50] Field of Search ........................................... 307/311,
312, 216; 350/160; 250/216

[56] References Cited
UNITED STATES PATENTS

| 3,402,300 | 9/1968 | Pearl .............................. | 307/311 |
| 3,239,688 | 3/1966 | Price .............................. | 307/312 |
| 3,439,289 | 4/1969 | Kosonocky .................... | 307/312 |
| 3,476,459 | 11/1969 | Reader ......................... | 307/311 |

*Primary Examiner*—Roy Lake
*Assistant Examiner*—Darwin R. Hostetter
*Attorneys*—R. J. Guenther and Kenneth B. Hamlin

ABSTRACT: Control beams of electromagnetic radiation are applied to a member of saturable, energy-absorbing material to control the transmission of a signal beam therethrough. Incoherent beams on different volumes of material accomplish a threshold gate logic function, and similar beams on a common volume accomplish the OR logic functions. The use of coherent control beams produces an interference pattern of alternate bands of saturated and absorbent material, which pattern attenuates the transmission of the information beam through the material even though each control beam is of sufficient intensity, when acting alone, to saturate the material so that it is essentially transparent to the signal beam. Information signal transmission occurs as an EXCLUSIVE OR logic function of the coherent control beams, and such function is extendable for generating a logical NEGATION function and for complementing the information in a photographic transparency.

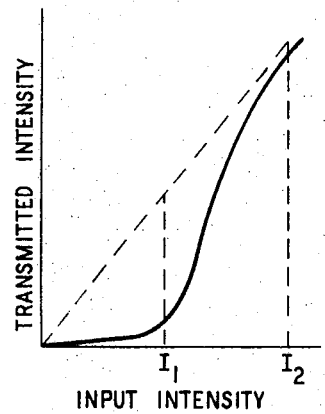
FIG. 1
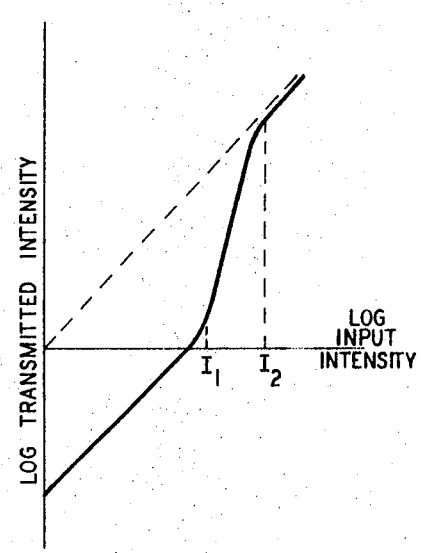
FIG. 1A
FIG. 2
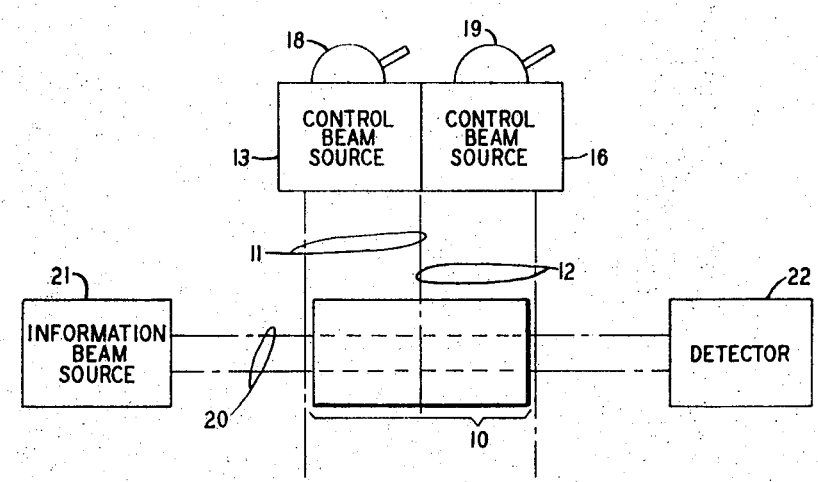

PATENTED NOV 2 1971 3,617,779

ELECTROMAGNETIC ENERGY LOGIC EMPLOYING SATURABLE ABSORBERS

BACKGROUND OF THE INVENTION

1. Field of the Invention

This invention relates to electromagnetic energy logic using saturable absorbers; and it relates particularly to such logic which employs multiple, energy control beams for affecting the energy transmission characteristics of a saturable absorbent member.

2. Prior Art

Increasing interest is evident in the use of electromagnetic radiant energy techniques for performing various functions such as information storage and processing and for various switching and coupling arrangements. Such techniques are usually illustrated in terms of energy in the visible frequency range. Some techniques for accomplishing various tasks in this area are difficult to use because they are hypersensitive to dimensional variations in the apparatus employed and to phase and intensity relationships among various radiation components.

It is known in the prior art that the incidence of a light beam of sufficient intensity upon a member of a saturable absorbent material can render the material essentially transparent to the beam even though it had theretofore been essentially opaque at low light intensity. However, the extent of logic operations that have been performed with such arrangements is quite limited. One difficulty in using saturable absorption for logical operations arises from the fact that there is at least an order of magnitude difference between intensities for the essentially opaque and transparent states. Consequently a cell illuminated by only one beam of half-activation intensity is nevertheless nearly transparent, and the realization of some types of logic is difficult.

It is, therefore, one object of the invention to extend the range of electromagnetic radiant energy functions which are available to the designer.

It is another object to employ optical techniques to implement various logical functions.

An additional object is to utilize saturable, electromagnetic-energy-absorbent material for logic operations.

A further object is to turn to advantage the characteristics of the interplay between coherent beams of electromagnetic energy.

Yet another object is to achieve optical logic operations with relative insensitivity to phase variations among different light components.

A still further object is to utilize coherent light for logical operations.

SUMMARY OF THE INVENTION

The aforementioned and other objects of the invention are realized in an illustrative embodiment in which plural control beams of electromagnetic energy are selectively applied to a member of saturable, energy-absorbing material to control the transmission characteristics of the material for an information signal beam of electromagnetic energy. In the illustrative embodiments presented herein electromagnetic energy in the visible range is employed, but the invention is not so limited.

It is one feature of the invention that illustrative saturable absorbent materials include solutions containing a solute such as cryptocyanine or one of the phthalocyanines. However, numerous other materials are known in the art; and the invention turns on the absorbent characteristic of such materials without limitation to any particular physical state of the material.

It is another feature that control beams of electromagnetic energy fix the energy absorption level of the saturable absorbent material and thereby determine the amount of energy absorbed from the information signal beam which is also applied to the material.

An additional feature is that control beams of incoherent light incident upon the absorbent material control the amount of energy absorbed from an information signal beam also applied to the material.

It is a further feature that the control beams of coherent energy in certain embodiments intersect in a predetermined volume of a saturable absorber to place the overall body of the absorbent material in an energy absorption state which is below the threshold of the onset of complete saturation, although either control beam alone is capable of completely saturating the aforementioned predetermined volume.

Yet another feature is that in one embodiment one of the control beams and the information beam are collinearly oriented to irradiate the saturably absorbent member from opposite directions to permit the performance of contrast reversal operations.

BRIEF DESCRIPTION OF THE DRAWING

A more complete understanding of the invention and its various features, objects, and advantages may be obtained from consideration of the following detailed description when taken in connection with the appended claims and the attached drawing in which:

FIGS. 1 and 1A are plots of transmitted energy intensity versus input energy intensity which are supplied to facilitate an understanding of the invention;

FIG. 2 is a simplified diagram of an optical threshold gate logic arrangement;

DETAILED DESCRIPTION

Figure 3:
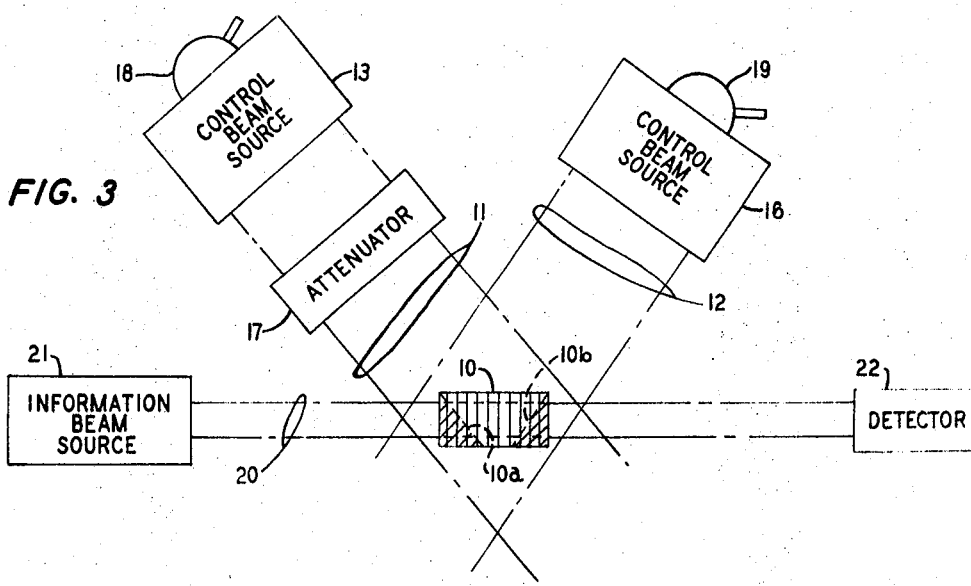
FIG. 3 is a simplified diagram of an optical EXCLUSIVE OR logic arrangement.

It has been previously noted herein that there are materials known in the art which are capable of absorbing a significant portion of radiant electromagnetic energy which is incident thereon up to a finite intensity level. For incident intensities above that level such materials are essentially transparent to applied radiation because the absorption capability of the material has been saturated. Two examples of such saturable absorbers are the dye cryptocyanine dissolved in methanol at a concentration of a few molecules per 10 million and the dye chloroaluminum phthalocyanine dissolved in chloronaphthalene to a similar concentration. These concentrations are typical in only the broadest sense because the concentration employed is dependent upon the thickness of the absorption cell and upon the desired transmission range, i.e., the illumination intensities which are to be used to produce the saturated condition. For example, the indicated concentration of the latter material would be used with a cell thickness of about 1 centimeter and a saturation illumination intensity of about $3 \times 10^6$ watts per square centimeter. However, the parameters are not critical because satisfactory operation is available over a range of values in each case.

The mentioned dyes can be used in other solvents as is known in the art, and other known dyes can also be similarly employed. There is also no reason to limit the concept to liquids since solids and gases are known to have saturable absorbing characteristics of the type here considered. In any case wherein the absorbent material must be contained, the container is transparent to electromagnetic radiation, including light, and has optical surfaces for minimizing wave front distortion and scattering of transmitted radiation.

The aforementioned saturable absorption characteristic of the materials is believed to arise from the action of applied electromagnetic energy which raises electrons in the material to a high energy state as a function of the intensity of the applied radiation. After a predetermined delay time, the electrons fall back to a stable ground state and can then be reactivated to the high energy state once more. If the applied energy intensity is high enough, the electrons are held at their high energy state substantially continuously so that no further energy can be absorbed from the incident radiation, and the material is apparently saturated.

The energy levels of incident radiation required to control operation of a saturable absorber in the manner described are functions of such factors as the effective area of an absorbing molecule of the material for receiving radiation, the decay time of the electrons from the high energy level to the ground energy level, the type of solution in which the absorbing dye is contained, and the frequency of the applied radiation. Different combinations of these factors produce different absorption results for meeting different purposes as is known in the art. Thus, for example, a material with a long decay time is desired if the logic function to be preformed is to include a significant memory function. However, a short decay time is desired if the logic is to be performed rapidly.

FIG. 1 presents a typical saturation characteristic for a saturable absorber of the type herein described. In FIG. 1, transmitted energy intensity is plotted against the input energy intensity of applied radiation. The intensity level $I_1$ represents the threshold of the onset of nonlinearity for energy transmission, and below that level the material is essentially opaque in that energy transmission is essentially linear but at a high energy absorption level. At the level $I_1$ the material is beginning to show some signs of saturation and is becoming less opaque to information-representative energy transmission. The intensity level $I_2$ in FIG. 1 is the threshold of the onset to complete saturation. Beyond $I_2$ the saturated absorber is essentially transparent to the applied energy intensity in that energy transmission is substantially linear at a much lower, virtually negligible, level of energy absorption. The broken line in FIG. 1 represents equality of transmitted and applied energy intensities, and the solid line in the diagram represents the characteristic of the previously described saturable absorbent material.

The diagram of FIG. 1 presumes, of course, that the applied intensity refers to the total of control and information-bearing energy which one applies to the material. In accordance with one aspect of the present invention, plural, high intensity, control beams of electromagnetic energy are applied to the saturable absorbent material to determine the overall state of absorption or saturation thereof so that the transmission of a separate, low-intensity, information-bearing beam may be readily controlled.

The intensity plot of FIG. 1 is not drawn to an accurate linear scale because to do so would make the plot unduly large. Similar data plotted on a log-log scale appears as in FIG. 1A with the illustrated origin representing the 1,1 point of the intensity plot. The effect of the log-log plot is to illustrate the low intensity region in more detail. It can be seen that below $I_1$ the material actually is translucent and has essentially linear transmission, but the transmitted intensity is significantly attenuated by energy absorption through the material. In practical embodiments there is insufficient transmission for intensities below $I_1$ to be generally useful or to cause interference with other system functions. Above $I_2$ the material is essentially transparent as indicated by the further region of linear transmission with the input and transmitted intensities being nearly equal. Between $I_1$ and $I_2$ the ratio of $I_2$ to $I_1$ increases over one to two orders of magnitude. Consequently the use of coincident half-activation signals in the usual sense of magnetic logic is not practical because each signal would have a magnitude so near to the $I_2$ intensity that it could by itself practically activate the material to the transparent state.

In FIG. 2 there is illustrated in end view a simplified threshold gate logic arrangement utilizing a saturable absorber of the type hereinbefore described. Thus, a cell 10 of a saturable absorbent material is arranged to be irradiated by a plurality of control beams of either coherent or incoherent electromagnetic energy radiation to control the transmission of a signal energy beam 20 through the cell. Only two beams, 11 and 12, are shown to preserve the simplicity of the drawing. Details of the manner of producing, orienting, and controlling the various energy beams, and of the detection thereof, are not shown because such details are well known in the art and comprise no part of the present invention.

The beams 11 and 12 are provided in FIG. 2 by light sources 13 and 16, respectively. Two such sources are shown in the drawing to maintain the simplicity thereof even though in practice it is often more advantageous to employ a single source and provide an optical system of a type known in the art to convert the output of that source into two separate beams of energy which can be readily oriented to irradiate the cell 10 in any desired manner. In FIG. 2 the beams 11 and 12 are oriented to be parallel to one another and contiguous so that they define a volume in space which includes all of the cell 10. However, the beams 11 and 12 intersect different contiguous volumes of cell 10 so that there is no part of the cell which cannot be illuminated by at least one of the beams; and, if convenient, the beams 11 and 12 may overlap to a certain extent in the cell.

Switches 18 and 19 are provided on the sources 13 and 16 to represent schematically the fact that such sources can be selectively turned on or off by arrangements which are not shown in detail but which are well known in the art. Thus, one or more control beams, or no control beams, are actuated to perform various logic operations as hereinafter described for FIG. 2 and for FIGS. 3 and 4. If the illustrated logic arrangement is employed in an overall data processing system, the switches 18 and 19 also represent schematically the selective control of their respective control beam sources by a programmed or other control arrangement for the system as is well known in the art.

Each of the beams 11 and 12 is advantageously made up of either multichromatic or monochromatic light but must contain sufficient energy in the frequency range of the saturable response characteristic of cell 10 to equal or exceed the intensity $I_2$ for its respective part of cell 10. In an arrangement having the indicated control beam intensities and orientations, the illustrated embodiment operates in a threshold logic mode. Thus, when both of the control beams 11 and 12 are present, the absorption capabilities of the entire cell 10 are saturated, and an information beam 20 is readily transmitted through the cell. The beam 20 typically has a low average intensity which is below the intensity $I_1$ for the material of the cell, and it is pulsed or otherwise modulated to represent information. Thus, the beam 20 passes along a path through a cell 10 and is detected by any optical detector 22. If either or both of the control beams 11 and 12 are absent, the portion of the cell 10 in the path of that beam is dark and presents a high absorption capability to the information signal beam 20. Thus, for example, if beam 12 is switched off, the right-hand portion of cell 10 is dark and includes sufficient material of the cell in the path of the beam 20 to present a large absorption capability. Consequently, the cell is essentially opaque to the beam 20 and transmits insufficient energy from that beam to activate the detector 22.

FIG. 3 depicts an embodiment of the invention wherein the control beams 11 and 12 are oriented to intersect so that they define a predetermined volume in space which includes the cell 10. This embodiment is capable of performing various types of logic operations on a common volume of cell 10 which is completely included in a common volume in space which is defined by the intersection of beams 11 and 12. The various beam sources and the detector are otherwise similar to those employed in FIG. 2. In addition, however, a light attenuator 17 of any appropriate type known in the art is advantageously interposed in the beam 11 between its source 13 and the cell 10 for adjusting intensity of the beam. A similar attenuator, not shown, can also be advantageously provided in the beam 12.

If the beams 11 and 12 are multichromatic incoherent beams with energy components in the frequency range of the absorption-saturation characteristics of the cell 10, the cell is operated in an INCLUSIVE OR logic mode. Thus, either one of the beams 11 and 12 is capable, when acting alone, of saturating the cell 10 so that it presents substantially no attenuation of information signal energy in the beam 20 which is applied thereto from the information signal source 21. Likewise the presence of both control beams saturates the cell. However, in the absence of both of the control beams 11 and 12, the full absorption capability of cell 10 is available, and the cell is thereby rendered opaque to the comparatively weak information beam 20. More than two control beams can be employed in the same OR logic circuit.

In applications wherein beams 11 and 12 are monochromatic light beams, a laser source is advantageously employed, together with arrangements previously noted for forming the output thereof into a pair of intersecting beams in the fashion shown in FIG. 2, to produce the beams. For example, a ruby laser advantageously provides 6,943 A light beams which are in the band of useful absorption and saturation characteristics of cell materials previously cited and which are of ample intensity individually to saturate the cell.

Beams 11 and 12 are applied as coherent energy beams that have electric vectors which are parallel to one another and perpendicular to the directions of beam propagation. This orientation of coherent beams assures a maximum contrast pattern of interference between the beams 11 and 12 in the region in space where they intersect as is known in the art. That region includes the cell 10 as illustrated in FIG. 3. A typical laser source produces output beams with a beam diameter of a few millimeters and such a beam is advantageously focused down in some applications, by structures known in the art but not shown, to obtain a desired power per unit of area of the cell surface upon which the beam is incident. However, a ruby laser has sufficient energy density, without focusing, to perform the indicated logic operations in a cell of about a centimeter along the path of beam 11 or beam 12 and a similar dimension along the path of beam 20.

The beams 11 and 12 are advantageously of the same intensity, and the attenuator 17 is adjusted to provide this relationship. For example, if a digital attenuator is employed it can take the form of a linear neutral density absorber with energy-absorbing members of different thicknesses being inserted or removed until the desired beam intensity relationship is attained. If analog intensity adjustment is desired, an input polarizer and an output biprism (not shown) are advantageously employed in attenuator 17 to operate on the polarization of the beam 11. In the latter case the biprism is maintained in a fixed orientation to assure the aforementioned parallel relationship between electric vectors of beams 11 and 12, and adjustment of beam intensity is achieved by adjusting the orientation of the input polarizer of the attenuator 17.

Control beams of unequal intensities can, of course, be employed. In that case, however, the intensities must be proportioned with respect to the threshold intensities $I_1$ and $I_2$ for the material to be sure that the interference pattern is sufficiently distinct to present enough absorption capability to assure the desired attenuation of beam 20.

It is well known that intersecting beams of coherent light produce an interference pattern in the region of intersection. Such pattern, sometimes called "fringes," is iterative in nature and includes alternate bands of high and low intensity illumination with the bands oriented to bisect the angle between the respective directions of the beams which produce them. There are, of course, transition regions between bands corresponding to the region between $I_1$ and $I_2$ of FIG. 1A. The cell 10 which is interposed in the volume of intersection between the beams 11 and 12 responds to the alternate bands of high and low intensity illumination by sustaining a pattern of of corresponding alternate bands of saturation and high energy absorption capability characteristics. The last-mentioned pattern is iterative across the parts of cell 10 which are illuminated by control beam parts that are incident upon the same cell surface so that they pass through equal path lengths within the cell.

Thus, in FIG. 3, where cell 10 is shown in end view the portion of the cell 10 which lies between the oblique broken lines 10a and 10b includes an interference pattern of the type described, which is created by portions of beams 11 and 12 entering the cell 10 through the upper surface thereof. The pattern of alternate bands of absorption and saturation is schematically indicated by spaced vertical lines in the central portion of the end view of cell 10. Such bands extend along the dimension of cell 10 which is perpendicular to the plane of the drawing and which is irradiated by intersecting beams 11 and 12. Each vertical line represents a saturation band and the intermediate regions represent absorption bands. The relative proportions of the material with high and low absorption capability are controlled by raising or lowering the intensities of either or both of the beams 11 and 12, i.e., the net absorption of the cell is so controlled.

In the portion of the cell material with a regular interference pattern, a significant absorption capability is retained, and the pattern must include a sufficient number of absorption bands in that portion of the cell 10 so that the beam 20 is substantially completely attenuated, and the detector 22 receives no significant input. However, if either of the control beams 11 or 12 is switched off, the other beam saturates the entire cell 10, as hereinbefore described, and the information beam 20 is readily transmitted through the cell 10 to the detector 22. If both of the beams 11 and 12 are switched off, the cell 10 retains its full absorption characteristic, and the beam 20 is completely attenuated so that the detector 22 receives no detectable input. Thus, the cell is operated in an EXCLUSIVE OR mode when used with coherent light control beams whereas it operated in an INCLUSIVE OR mode when used with a noncoherent light control beams.

References have been made to cell 10 being either opaque or transparent to the beam 20. Such references are for convenience of description. In actual practice with respect to FIG. 3 it is necessary only that the presence of both control beams allow one level of transmission (zero in some cases) of beam 20 and that the presence of only one control beam allow a higher level of transmission. If a binary digital response is desired, detector 22 can have an appropriate built-in optical or electrical threshold to discriminate between the two transmission levels. Also, beam 20 must be oriented to pass nonparallel to the pattern bands in the central portion of cell 10 to be sure that when both control beams are present no portion of the signal beam 20 can pass along saturation bands to detector 22.

It will be noted in FIG. 3 that portions of the beams 11 and 12 illustrated there enter the cell 10 through the left-hand end surface and the right-hand end surface, respectively, of the cell. These portions of each control beam necessarily pass through shorter path lengths in the cell 10 than do the interfering portions of the other control beam which pass through the top of the cell. Consequently, in the lower left and lower right corners of the cell, the iterative pattern of interference is degraded as indicated by multiple crosshatching in those corner portions. Some intermediate level of absorption prevails in these corner portions of the cell, but it does not interfere with the EXCLUSIVE OR operation already described. If in any particular application the mentioned end portions should present a problem, the cell geometry can be arranged to omit them.

In any particular application of the invention the determinative factor for exercising signal beam control is the total length of absorbent material in the signal beam path. That length must be sufficient to lower the transmitted intensity of information beam 20 below the detection threshold of detector 22 and will be different for various beam intensity levels, beam frequencies, cell sizes, and cell materials. In the EXCLUSIVE OR embodiment of FIG. 3 that absorbent material length is made up of the total widths of absorption bands in the path. Consequently the useful part of cell 10 advantageously spans several iterations of the interference pattern of control beams 11 and 12 to assure a stable length of absorbent material in the cell 10. If a greater or lesser amount of attenuation is desired along the path of beam 20, fine adjustments can be made by altering the intensity of either or both control beams with respect to $I_1$ and $I_2$ for the cell material. For coarse adjustments, cell 10 is replaced by a cell with a correspondingly longer or shorter dimension in the iterative pattern portion of the cell to place more pattern iterations, and thus more absorbent material, in the path of beam 20.

A stable interference pattern in cell 10 is preferred because it facilitates precise control of cell attenuation level in applications where such control is needed. However, a stable pattern is generally not essential. If, as a result of vibration or some other spurious effect, a change occurs in the phase relationship between the control beams 11 and 12, the illustrated iterative pattern of interference simply shifts laterally across the cell 10 along the path of the information beam 20. Because a comparatively large number of pattern iterations remain in the path of the beam when both control beams 11 and 12 are present, the attenuation effect upon the beam 20 is unchanged by the spurious change in phase relationship. Consequently, the beams 11 and 12 are readily operated to control the gating of the information beam 20 in a comparatively noncritical fashion.

Furthermore, beams 11 and 12 can, if convenient, be supplied by separate sources that are at different frequencies or phases as long as any shifting pattern produced in cell 10 can be sufficiently rapidly followed by the saturable absorbent material to avoid effective saturation of the entire cell. The rapidity with which the material can follow is a function of its decay time for electrons to return to a ground energy level from an upper level of the absorption transition. Thus, the decay time for the material must be short enough to allow electrons to settle back to their ground state as an interference pattern region changes from high to low intensity illumination. This is necessary to make the interference pattern perceptible as it shifts across the cell, "perceptible" being used here in the sense that the pattern presence can be determined at least as a function of energy attenuation in beam 20.

The embodiment of FIG. 3 is also useful for performing logical negation as a special case of the EXCLUSIVE OR mode of operation. For negation the selective operation of the control beams 11 and 12 is modified to the extent that one of them is cyclically pulsed. Thus, for example, each time switch 18 is cyclically operated to turn control beam 11 on, the signal beam 20 is extinguished if control beam 12 is then also present.

Figure 4:
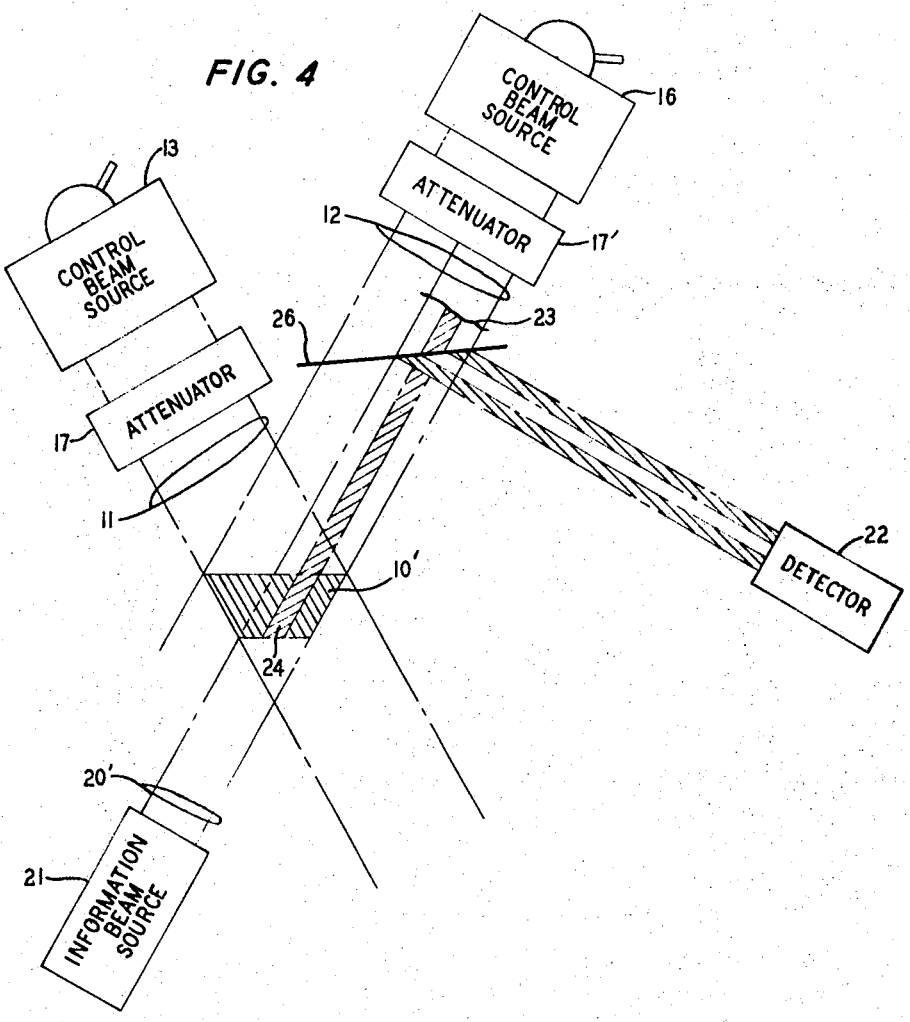
FIG. 4 is a simplified diagram of a contrast reversal embodiment.

In FIG. 4 the EXCLUSIVE OR logic of FIG. 3 is extended to the contrast reversal function that is conventionally illustrated in connection with a message member such as a photographic transparency 23. In this figure circuit elements corresponding to those previously described in connection with FIGS. 2 and 3 are designated by the same or similar reference characters. For clarity, the saturable absorbent cell in FIG. 4 has been modified in shape as shown by the cell 10', which includes no corner portions outside of the desired iterative interference pattern in the cell.

In the FIG. 4 embodiment the information signal source 21 is oriented to direct beam 20' to be substantially collinear with beam 12 in cell 10' and to irradiate the cell 10' in opposite direction with respect to the beam 12. If the cell is of the type employed in FIG. 3, beam 20' is also advantageously oriented so that it passes through no corner parts of the cell with imperfect interference patterns. The beam 20', as supplied by the source 21, is unmodulated in this embodiment. Transparency 23 is inserted in a portion of the beam 12, which is between the source 16 and the cell 10', and which is also collinear with the beam 20'. The transparency 23 may be a single opaque body, a normal photographic scene with clear, opaque, and gray portions, or a digital-information-bearing transparency with information represented in a binary system by opaque and clear portions of the transparency.

The information contained in the transparency 23 is projected in uncomplemented form upon the cell 10'. That is, dark portions of the transparency cause corresponding portions of cell 10' to be unilluminated by beam 12, and light portions of transparency 23 cause corresponding portions of the cell 10' to be illuminated. In the portions of cell 10' which are thus illuminated by the beam 12, the normal interference with beam 11 takes place and the cell 10' is opaque to the transmission of those portions of the beam 20'. Similarly, portions of the cell 10' which are not illuminated by the beam 12 produce no interference pattern with the control beam 11 and are thus saturated to transmit readily corresponding portions of the beam 20'. Thus, beam 20' is projected through the cell 10' and modulated thereby to contain light portions corresponding to dark portions on transparency 23, and dark portions which correspond to clear portions of the transparency 23.

The described effect is illustrated by assuming in FIG. 3 that the central band of transparency 23 is opaque and the edge bands are clear. A corresponding shadow is cast by beam 12 on cell 10' to produce a channel 24 of material which is saturated by beam 11 and through which a corresponding portion of beam 20' is readily transmitted.

A beam splitting mirror 26 is interposed in the beam 12 between the transparency 23 and the cell 10' for diverting the modulated beam 20' to the detector 22 for utilization of the information modulation contained therein. It can be seen in FIG. 3 that the modulated beam applied to detector 22 has the complement of the information in transparency 23, i.e., the central part is bright and the edge parts are dark. In the region between mirror 26 and cell 10' only the shadow effects in beam 12 are indicated. The shadow effects in beam 20', which are also present in that region, are shown in the region between mirror 26 and detector 22.

It is advantageous in the embodiment of FIG. 4 to operate with unmodulated control beam intensities that are substantially the same. This intensity relationship is achieved by adjusting attenuator 17 and ascertaining beam intensity by means of light probes (not shown) inserted in in the beam paths. If transparency 23 contains only binary digital information, the intensity relationship can be achieved more directly by simply adjusting attenuator 17 for maximum contrast at detector 22.

If transparency 23 includes gray portions, they are represented in the projection onto cell 10' by corresponding gray levels within the range of the gray scale. Such grays produce corresponding intermediate absorption levels so that the complemented gray information is modulated onto the beam 20'. In other words, the gray parts of the projection represent regions where the modulated control beam 12 is of lower intensity than is control beam 11. The resulting control beam interference in those regions is weak, with the result that there is a corresponding reduction in attenuation of information beam 20'. Thus, gray scale variations, roughly corresponding to the complement of corresponding variations in transparency 23, are produced in the portions of beam 20' diverted by mirror 26 to detector 22.

Actually the optimum conditions for maximum black-white contrast and for faithful gray scale reproduction are inconsistent. For good contrast the two control beams should be of equal intensity at a level at least as great as the level $I_2$. However, for faithful gray scale reproduction the two control beams should have unequal intensities between the $I_1$ and $I_2$ thresholds and fixed so that the maximum net intensity along the path of information beam 20' is never more than $I_2$, and the minimum net intensity along that path is never less than $I_1$. Preferably these maximum and minimum net intensities are further restricted so that both lie on the same reasonably linear portion of the material characteristic between $I_1$ and $I_2$. One way to achieve the desired gray scale results is to set control beam 11 at an intensity about midway in a preferred range of the material transition characteristic between $I_1$ and $I_2$ and then adjust an attenuator 17' to set the intensity of control beam 12 for best observed gray scale reversal fidelity.

One might initially guess that for any arrangement looking to gray scale reversal fidelity there would be trouble at the low intensity end of the range where the control beams subtract to produce near zero intensity because that intensity could be far below the $I_1$ threshold of the onset of nonlinearity. However, by making the control beams of unequal intensity, with beam 11 being the stronger, a minimum net absorption band intensity is maintained which is greater than $I_1$ by the desired amount to assure a desired minimum net illumination intensity along beam 20' to correspond to the bottom of the preferred range for faithful gray scale reversal.

Although the present invention has been described in connection with specific embodiments thereof, it is to be understood that other embodiments and modifications which will be apparent to those skilled in the art are included within the spirit and scope of the invention.

I claim:

1. In combination,
   a member containing material which is capable of absorbing electromagnetic energy incident thereon, said material having a transmitted-versus-incident energy intensity characteristic including a first range of substantially linear energy transmission at a high energy absorption level in a first predetermined irradiation intensity range, and a second range of substantially linear transmission at a much lower energy absorption level in response to the same type of irradiation but in a second predetermined intensity range higher than said first range,
   means supplying to said member a plurality of control beams of said energy for controllably actuating said member to the second intensity range for producing the corresponding energy absorption capability of said member along a predetermined path through said member, said control beams being oriented to intersect in a common volume in space so that each beam irradiates the full extent of said path, and
   means applying along said path in said member an information signal energy beam different from said control beams, with an intensity in said first range.

2. The combination in accordance with claim 1 in which
   said characteristic has at the upper end of said first range a first predetermined threshold of the onset of nonlinearity and at the lower end of said second range a second predetermined threshold of the onset of saturation, and
   said material and the length of said path being proportioned to produce a predetermined difference between transmitted energy levels at said first and second thresholds.

3. The combination in accordance with claim 1 in which said material includes cryptocyanine.

4. The combination in accordance with claim 3 in which said member comprises a solution of said material in methanol.

5. The combination in accordance with claim 1 in which said material includes chloroaluminum phthalocyanine.

6. The combination in accordance with claim 5 in which said member comprises a solution of said material in chloronaphthalene.

7. In combination,
   a member-containing material which is capable of absorbing electromagnetic energy incident thereon, said material having a transmitted-versus-incident energy intensity characteristic including a first range of a high energy absorption level in a first predetermined irradiation intensity range, and a second range of substantially linear energy transmission at a substantially saturated energy absorption capability in a second predetermined intensity range higher than said first range,
   means supplying to said member a plurality of control beams of said energy for controllably producing said saturated energy absorption capability in said member along a predetermined path through said member, said control beams being oriented to intersect in a common volume in space so that each beam irradiates the full extent of said path,
   said control beams being of incoherent energy,
   each of said control beams having an intensity in said second range,
   means applying along said path in said member an information signal energy beam different from said control beams, with an intensity in said first range, and means selectively actuating one or more of said control beams to permit substantially full transmission of said signal energy beam in the presence of any one or more of said control beams.

8. The combination in accordance with claim 25 in which each of said control beams has an intensity in said second range.

9. The combination in accordance with claim 23 in which each of said control beams has an intensity between, and in neither of, said first and second ranges.

10. The combination in accordance with claim 1 in which
    said control beams are of such similar phase and frequency that they produce, when more than one is present, a perceptible interference pattern in said material,
    each of said control beams has an intensity in said second range, and
    means selectively actuate one or more of said beams to permit substantially full transmission of said signal energy beam in the presence of no more than one of said control beams.

11. The combination in accordance with claim 10 in which said selective actuating means includes means cyclically actuating a predetermined one of said control beams.

12. The combination in accordance with claim 1 in which said control beams are differently oriented to produce, when at least two are present, in a predetermined volume of said member including a part of said path an energy interference pattern producing in adjacent bands of said material different levels of absorption capability, said bands intersecting said signal beam.

13. The combination in accordance with claim 12 in which said pattern is an iterative pattern of alternate bands of absorption capability and saturation.

14. The combination in accordance with claim 13 in which said control beams are coherent beams, and said pattern is substantially stationary in said member.

15. The combination in accordance with claim 1 in which said control beams are beams of coherent light, each including the same frequency components in a range to which said material is responsive in accordance with said transmission-versus-intensity characteristic.

16. The combination in accordance with claim 15 in which said control beams have electric vector components, and said electric vector components of said control beams are parallel to one another and perpendicular to beam propagation directions.

17. The combination in accordance with claim 15 in which said member includes a plurality of different surfaces, and said control beams each include a portion entering a common surface of said member to define by intersection of such portions a predetermined volume of said material through which said path extends.

18. In combination,
    a member containing material which is capable of absorbing electromagnetic energy incident thereon, said material having a transmitted-versus-incident energy intensity characteristic including a first range of substantially linear energy transmission at a high energy absorption level in a first predetermined irradiation intensity range, and a second range of substantially linear transmission at a much lower energy absorption level in a second predetermined intensity range higher than said first range,
    means supplying to said member a plurality of control beams of said energy for controlling the energy absorption capability of said member along a predetermined path through said member, said control beams being oriented to intersect in a common volume in space so that each beam irradiates the full extent of said path, said control beams being beams of coherent light, each including the same frequency components in a range to which said material is responsive in accordance with said transmission-versus-intensity characteristic, means applying along said path in said member an information signal energy beam different from said control beams, with an intensity in said first range, said signal energy beam and one of said control beams being collinearly oriented in said material for projection in opposite directions toward said material, a message member with predetermined information-representative light transmission characteristics interposed in a part of said one control beam which is collinear with said signal energy beam and between said control beam-applying means and said material, and beam splitting means interposed in said one control beam between said message member and said material to divert said signal energy beam, the diverted beam containing intensity modulations across its cross section representing the complement of said light transmission characteristics.

19. The combination in accordance with claim 18 in which means are provided for adjusting the intensity of a second one of said control beams for optimum contrast between dark and light portions of said cross section.

20. The combination in accordance with claim 18 in which said control beams are oriented to intersect in a predetermined common volume of said material to produce therein an interference pattern of alternate bands of different levels of energy absorption, said transmission-versus-irradiation characteristic includes between said absorption and linear transmission portions a portion of nonlinear absorption, and said control beams have intensities individually in said portion of nonlinear absorption but, in combination, providing a maximum absorption capability in said path less than that corresponding to maximum intensity in said first range and a minimum absorption capability in said path greater than that corresponding to minimum intensity in said second range.

21. The combination in accordance with claim 12 in which means are provided for adjusting the intensity of at least one of said control beams for controlling the net absorption of said member along said path.

22. The combination in accordance with claim 15 in which said signal energy beam path is oriented in said member in a direction which is different from the direction of any of said control beams.

23. In combination, a member containing material which is capable of absorbing electromagnetic energy incident thereon, said material having a transmitted-versus-incident energy intensity characteristic including a first range of substantially linear energy transmission at a high energy absorption level in a first predetermined irradiation intensity range, and a second range of substantially linear transmission at a much lower energy absorption level in a second predetermined intensity range higher than said first range, means supplying to said member a plurality of control beams of said energy for controlling the energy absorption capability of said member along a predetermined path through said member, said control beams being oriented to intersect in a common volume in space so that each beam irradiates the full extent of said path, said control beams being of such similar phase and frequency that they produce, when more than one is present, an interference pattern in said material, means applying along said path in said member an information signal energy beam different from said control beams, with an intensity in said first range, said signal energy beam and one of said control beams being substantially collinearly oriented for projection in opposite directions toward said material, a message member with predetermined information-representative light transmission characteristics interposed in said one control beam between said control beam applying means and said material, and means detecting said signal beam after transmission through said material.

* * * * *